April 28, 1959     E. VAN BUREN     2,884,205
HUMIDIFIED AIR CONTROL SYSTEM
Filed Oct. 14, 1955     2 Sheets-Sheet 1
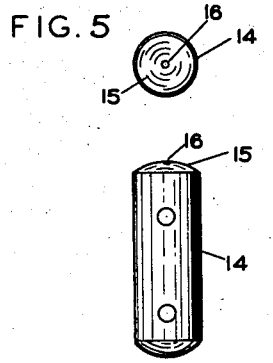
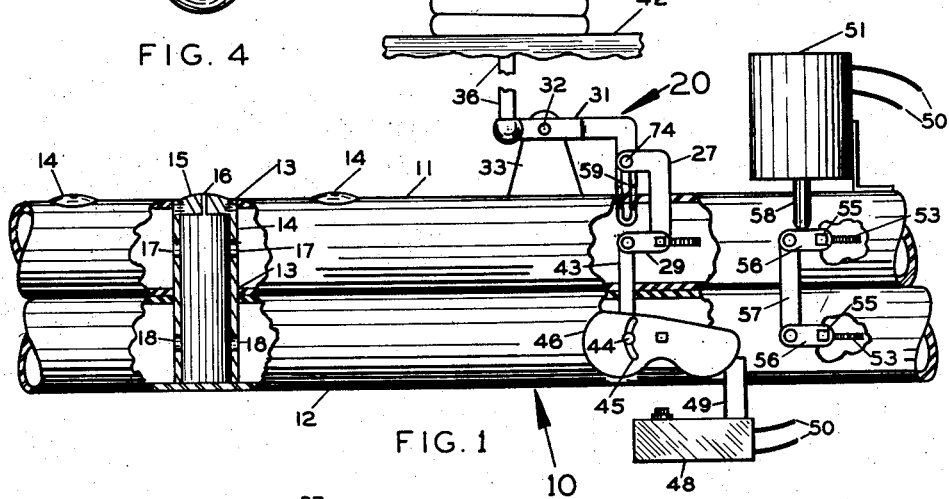
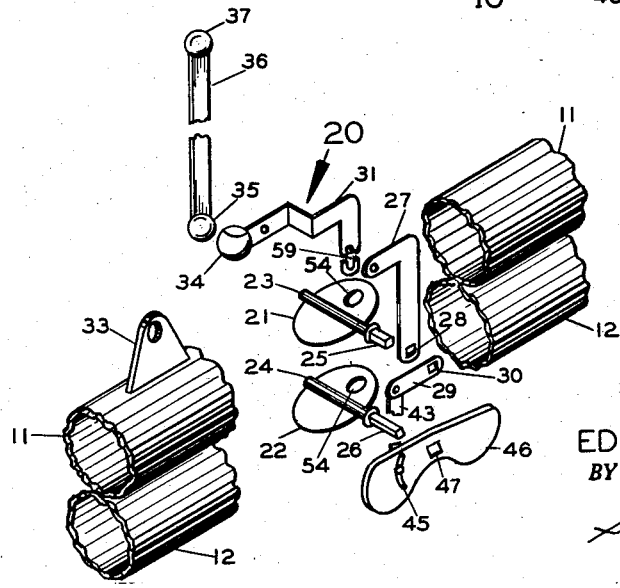
*INVENTOR.*
EDMUND VAN BUREN
BY
ATTORNEY April 28, 1959 E. VAN BUREN 2,884,205
HUMIDIFIED AIR CONTROL SYSTEM
Filed Oct. 14, 1955 2 Sheets-Sheet 2
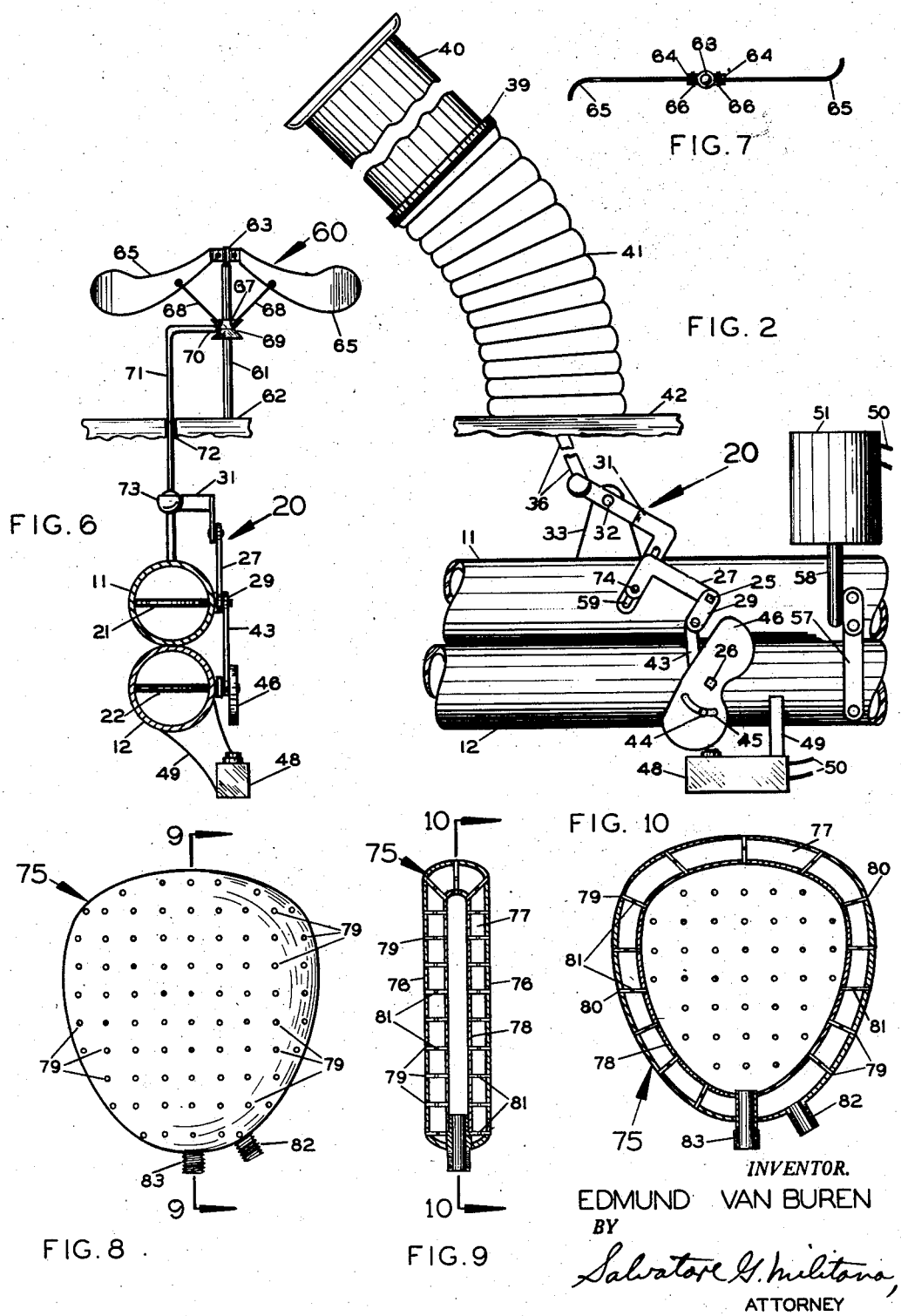
INVENTOR.
EDMUND VAN BUREN
BY
Salvatore G. Militana,
ATTORNEY United States Patent Office 2,884,205
Patented Apr. 28, 1959

2,884,205

HUMIDIFIED AIR CONTROL SYSTEM

Edmund Van Buren, Miami, Fla.

Application October 14, 1955, Serial No. 540,493

7 Claims. (Cl. 239—412)

This invention relates to a control system for spraying humidified air and is more particularly directed to a liquid and air control mechanism in a system such as I have shown and described in my copending patent application No. 427,713, now U.S. Patent 2,733,957.

In my copending application I show an automatically operated spray system consisting of spray pipes mounted on all four sides of an area to be sprayed and a wind operated control device for operating valves in the spray pipes so that only those spray pipes that are upwind of the area being sprayed will have spray being discharged from its nozzles. In this manner, there is a continual spray being discharged, and spread over the area in question by the assistance of the breeze or wind. As the wind direction changes then the wind operated control device will be effected to close the previously opened valves and open other valves so that the upwind spray pipes are always discharging the humidified air or spray into wind to be carried downwind across the area being sprayed.

The present invention contemplates an improvement of the above mentioned system by controlling the size of the droplets or moisture content in the spray in relation with the velocity of the wind then in force, so that the spray will not be carried off by the wind beyond the area to be sprayed. If there is very little breeze or wind the droplets of moisture in the spray will be small so that the wind will be capable of carrying the spray to the most distant parts of the area. As the wind increases in size, the droplets in the spray will become larger so that the now increased wind velocity will not carry the droplets of spray beyond the area being sprayed but will permit the droplets to settle to the ground within the desired area. Also, if the wind increases beyond a predetermined high velocity, the spray system will be cut off completely so that no spray is discharged into the high wind until the wind velocity is reduced to a predetermined velocity.

Therefore, a principal object of the present invention is to provide an automatically operated spray system with a wind operated device for varying the size of the droplets in direct ratio with the velocity of the wind.

A further object of the present invention is to provide a spray system with control means whereby the spray being discharged will settle down within the area desired to be covered by the spray at varying velocities of wind.

A still further object of the present invention is the provision of a control device for spray systems wherein upon the wind rising above a predetermined velocity the spray system is automatically cut off and will not discharge any spray until the wind velocity is reduced to a predetermined speed.

A still further object of the present invention is to provide a spray system with separate pipes for air and liquid under pressure and spray nozzles extending into the pair of pipes to discharge the spray formed by the air and liquid passing through the spray nozzles.

A further object of the present invention is the provision of a pan cake shaped spray head having a plurality of spray nozzles on all sides thereof whereby the spray head may be mounted on a truck and the like for spraying a large area.

With the foregoing and other objects in view, this invention embodies the features of construction, combination and arrangement of parts as will hereinafter be described in detail, illustrated in the accompanying drawings which disclose the preferred embodiments of the invention, and set out in the claims appended hereto.

In the drawings:

Figure 1 is a fragmentary side elevational view partially broken away of a spray system embodying my invention.

Figure 2 is a similar view showing the stack tilted by wind pressure.

Figure 3 is an exploded fragmentary view of the valve operating mechanism.

Figure 4 is a side elevational view of a discharge nozzle.

Figure 5 is a top plan view thereof.

Figure 6 is a cross sectional view of the spray pipes showing the valve operating mechanism actuated by a modified form of a wind responsive device.

Figure 7 is a top plan view of the wind responsive device shown in Figure 6.

Figure 8 is a front elevational view of a modified form of a spray head.

Figure 9 is a cross sectional view taken along the line 9—9 of Figure 8.

Figure 10 is a sectional view taken along the line 10—10 of Figure 9.

Referring to the drawings wherein like numerals are used to designate similar parts throughout the several views, the numeral 10 refers generally to the spray system consisting of a pair of pipes 11 and 12 connected to a source (not shown) of air and liquid respectively, under pressure as shown and described in detail in my copending application No. 427,713, now U.S. Patent 2,733,957. The pipes 11 and 12 are in contact relation with each other along their lengths, preferably joined as by clamps, soldering or the like and are provided with a plurality of bores 13 which extend through two walls of the air pipe 11 and one wall of the water pipe 12, which bores 13 receive an atomizing nozzle 14. The nozzle 14 is cylindrical in shape, having its lower end rounded to fit snugly against the inside wall of the liquid pipe 12 while a cap 15 is secured to the upper or discharge end of the nozzle 14. The cap 15 is provided with a centrally disposed bore 16 through which humidified air is discharged while bores 17 and 18 in the side wall of the body of the nozzle 14 permit the flow of air and liquid respectively from the pipes 11 and 12 into the nozzle 14. Since both the air and liquid in the pipes 11 and 12 are under similar pressure, as the liquid flows through the bores 18, 18 into the nozzle 14, the air entering the nozzle 14 through the bores 17, 17 causes the atomization of the liquid and the fine droplets of liquid are discharged through the bore 16 into the atmosphere. The size of these discharged droplets is determined by the air pressure as it compares to the liquid pressure. As the air pressure is reduced the flow of air into the nozzles 14 is reduced and consequently the size of the droplets is increased. Likewise, while the air pressure is increased then the size of the droplets in the spray will become smaller.

Interposed in the air and liquid pipes 11 and 12 between the nozzles 14 and the source of fluids under pressure, which is not shown, there is a valve control mechanism 20 operated by wind velocity consisting of a butterfly-type valve 21 and 22 pivotally mounted on pivot shafts 23 and 24 respectively in the air and water pipes 11 and 12. One end of each of the valve shafts 23 and 24 are square in cross section as at 25 and 26 and extend through and beyond the side wall of the pipes 11 and 12. An L-shaped lever 27 is provided with a square bore 28 which receives the squared shaft end 25 while a second lever 29 having a similar square bore 30 is likewise fitted on the squared end 25 of the shaft 23, so that the valve 21, shaft 23 and levers 27 and 29 operate in unison.

The free end of lever 27 is pivotally secured to a slot 59 in one end of an L-shaped lever 31 that is pivotally mounted adjacent one end by a pivot pin 32 mounted on a support 33 extending upwardly of the air pipe 11. The lever 31 which is off-set at its mid-portion for obvious reasons has a cup or socket joint 34 at its free end which receives a ball joint 35 mounted on a rod 36 whose other end likewise has a ball joint 37. The ball joint 37 is received by a socket joint 38 contained by a base portion 39 of an elongated stack 40 resting on a coil spring 41 or the like supported on a base or support 42.

On the free end of the lever 29 there is pivotally mounted one end of a link 43 whose other end is provided with a pin 44 fitted in a slot 45 formed in a plate member 46. The member 46 has a square bore 48 that receives the squared end 26 of the valve shaft 24. In the path of the swinging plate member 46 is a micro-switch 48 mounted on a bracket 49 which is secured to the water pipe 12. Electric wires connect the micro-switch 48 and a solenoid 51 together, which solenoid 51 is secured to a bracket 52 mounted on the air pipe 11.

The air and liquid pipes 11 and 12 are each provided with a second butterfly type valve 53 similar in construction with the valves 21 and 22 except that the valves 21 and 22 are provided with a small opening 54 while the valves 53 do not have such an opening. The valves 53 are pivotally mounted on shafts 55 identical in construction with the shafts 23 and 24. A horizontally disposed link 56 is secured at one end to each of the shafts 55, with the other ends having a vertically disposed link 57 pivotally mounted thereon for unitary operation of the valves 53. An armature 58 connected to the solenoid 51 extends to adjacent the top link 56 so that upon energizing the solenoid 51 the armature 58 moves outwardly pushing downwardly against the top link 56 and causing the links 56 to pivot, swinging the valves 53 to their closed position.

It can be appreciated that when the stack 40 is made to tilt by wind exerting a force thereagainst, the rod 36 will shift in an upward direction, compelling the lever 31 to pivot about the pivot pin 32. The downward movement of the end of the lever 31 connected to the lever 27 will cause the lever 27 to swing about its pivot, namely shaft 23 thereby swinging the valve 21 toward its colsed position. Obviously, the greater the velocity of wind, the more the stack 40 will tilt and thereby close the valve 21 to a greater extent. Therefore, as the wind velocity increases, less air will flow through the air pipe 11 and with the flow of liquid through the water pipe 12 unchanged in volume and pressure the spray formed by the nozzle 14 and discharged through the bore 16 will contain droplets of increased size. When the wind reaches a predetermined velocity, the pin 44 will reach the end of the slot 45 causing the plate member 46 to pivot about the valve shaft 24 and the liquid valve 22 to swing to its closed position. As the plate member 46 swings, it engages the micro-switch 48 which energizes the solenoid 51 to close off the valves 53, 53 as explained hereinabove. The air and liquid lines 11 and 12 are closed off by the valves 53 so that the flow of all fluid is now cut off. Any liquid and air trapped in the lines between the valves 53, 53 and 21, 22 will be discharged through the openings 54 in the valves 21 and 22. When it is decided to again operate the spray system, the micro-switch is reset, the solenoid 51 becomes deenergized and the armature 58 will slide upwardly opening valves 53, 53. If desired, the spray system may become automatically operated upon the dropping of wind velocity, since the stack 40 will become less tilted and the water valve 22 will be rotated to its open position at which time the plate member 46 will swing out of contact with the micro-switch 48 which may deenergize the solenoid 51 to open the valves 53, 53. By using ball and socket connections 38, 39 and 34, 35 the wind blowing from any direction will tilt the stack 40 to operate the valve control mechanism 20.

Referring now to Figures 6 and 7 there is shown a modification of the wind responsive device. This structure differs from that shown and described hereinabove, in that an anemometer-type instrument 60 is substituted for the stack 40, the remaining structure being identical in function and in construction. The wind actuable propeller 60 consists of a shaft 61 mounted vertically on a base 62. At the top end of the shaft 61 there is a collar 63 rotatably mounted thereon provided with a bifurcated lug 64 extending on opposite sides of the collar 63. A propeller vane 65 is pivotally mounted at its inner end as at 66 to each of lugs 64. Rotatably mounted on the shaft 61 is a second collar 67 suspended by wires 68 which are connected to the vanes 65 adjacent the inner ends thereof. The collar 67 is provided at its mid-portion with a groove 69 in which rides a pointed end 70 of an angular rod 71 whose lower end extends through a bore 72 in the base 62 and is connected to the outer end of the lever 31 with a ball and socket connection 73.

It can be seen that as the velocity of wind increases, the vanes 65 will rotate faster about the shaft 61. The outer ends of the vanes 65 will rise, the vanes 65 pivoting about the pivot pins 66, due to centrifugal force effected by the rapidly rotating vanes 65. Consequently, the collar 67 will slide upwardly on the shaft 61 carrying the upper end 70 of the rod 71 thereby operating the valve control mechanism 20 as described hereinabove in connection with the mechanism shown by Figures 1–3 inclusive.

In lieu of the nozzle 14 having a single discharge orifice 16, there may be utilized in the instant spray system a spray head 75 having a generally oval shape as shown by Figures 8–10 inclusive.

The spray head 75 which is preferably constructed of sheet metal consists of a pair of walls 76 joined at their ends to form a chamber 77. Within the chamber 77 is a second spray head 78 similar in shape with the spray head 75 but having its side and edge walls in spaced relation with the spray head 75. A plurality of spray nozzles 79 similar in construction with the spray nozzles 14 described hereinabove are mounted on the spray head 75 and in communication with the inner chamber of the spray head 78, each spray nozzle 79 having an axial bore 80 and transverse bores 81. The axial bores 80 communicate with the inner spray head 78 while the transverse bores 81 communicate with the outer spray head 75. Inlet pipes 82 and 83 are connected to the outside and inside spray heads 75 and 78 respectively, for the flow of air and liquid into the spray heads in order to create humidified air. Liquid under pressure entering the spray head 78 through the inlet 83 will fill the spray head 78 and enter the axial bores 80 of the spray nozzles 79. Air under pressure entering the spray head 75 through inlet 82 enters the transverse bores 81 of the spray nozzles 79 and atomize the liquid therein to form a spray of humidified air which is discharged by the plurality of nozzles 79.

By virtue of the fact that there are an extremely large number of spray nozzles 79 on the spray head 75, an exceedingly large volume of spray will be discharged thereby. The spray head 75 may be mounted on a vehicle along with the tanks of liquid and air under pressure and thereby render the spray apparatus portable. The spray apparatus would then be available to spray any desired area in a relatively short period.

Having described my invention, what I claim as new is:

1. A device of the class described comprising a plurality of fluid pipes, a plurality of valves, pivot means mounting one of said valves in each of said pipes, lever means secured to each of said pivot means for actuating said valves, a support rod, a collar rotatably mounted on said rod, said collar having a pair of outwardly extending lugs, a blade pivotally mounted at one end to each of said lugs, a second collar rotatably mounted on said support rod below said first named collar, means connecting said second collar and said blades adjacent said one end, said second collar having a peripheral groove, an angular rod connected at one end to said lever means and the other end engaging said groove in said second collar.

2. A device of the class described comprising a pair of fluid pipes, a spray head communicating with each of said pipes, a valve pivotally mounted in each of said pipes, valve actuating means connected to one of said valves, valve delay actuating means connecting said other valve and said valve actuating means and wind actuable means operatively connected to said valve actuating means for swinging said one valve toward its closed position before actuating said other valve.

3. A device of the class described comprising a pair of fluid pipes mounted in alignment with each other, a spray head communicating with each of said pipes, a valve pivotally mounted in each of said pipes, a lever connected at one end to one of said valves, a support, a second lever pivotally mounted on said support, pivot means connecting one end of said second lever and the other end of said first named lever, wind actuable means, means connecting said wind actuable means and the other end of said second lever, a link, an arm connecting said one end of said first named lever and one end of said link, a plate member pivotally mounted to said other valve, said plate member having a slot, a pin secured to said other end of said link, said pin being slidably mounted in said slot whereby upon the actuation of said wind actuable means, said other valve remains open until said first named valve is swung beyond a predetermined position a second valve pivotally mounted in each of said pipes, control means for said second valves and actuating means connected to said control means mounted in proximity of said plate member for closing said second valves upon pivotal movement of said plate member beyond a predetermined position.

4. A device of the class described comprising a pair of fluid pipes mounted in alignment with each other, a plurality of spray heads communicating with each of said fluid pipes, a plurality of valves, pivot means mounting one of said valves in each of said fluid pipes, a lever connected at one end to one of said valve pivot means, a support, a second lever pivotally mounted on said support, pivot means connecting one end of said second lever and the other end of said first named lever, wind actuable means, means connecting said wind actuable means and the other end of said second lever, a link, an arm connecting said one end of said first named lever and one end of said link, a plate member secured to said other of said valve pivot means, said plate member having a slot, a pin secured to said other end of said link, said pin being slidably mounted in said slot whereby upon the actuation of said wind actuable means said other valve remains open until said first named valve is swung beyond a predetermined closed position, a switch mounted in juxtaposition with said plate member, a solenoid connected with said switch, and a further valve pivotally mounted in each of said fluid pipes adapted to be swung to their closed position upon the actuation of said solenoid.

5. The structure as recited by claim 4 wherein said wind actuable means comprises a hollow resilient member, a stack mounted on said resilient member and a shaft connecting said stack and said other end of said second lever.

6. The structure as recited by claim 4 wherein said wind actuable means comprises a support rod, a collar rotatably mounted on said rod, said collar having a pair of outwardly extending lugs, a blade pivotally mounted at one end to each of said lugs, a second collar rotatably mounted on said support rod below said first named collar, means connecting said second collar and said blades adjacent said one end, said second collar having a peripheral groove, an angular rod connected at one end to said other end of said second lever and the other end engaging said groove in said second collar.

7. A spray head having a pair of side walls forming a chamber, an inlet connecting said chamber, a second pair of side walls mounted in spaced relation to said first named side walls within said chamber, said second pair of side walls forming a second chamber, an inlet connecting said second chamber, said first and second pair of side walls having a plurality of bores, a cylindrical member connecting each of said bores of said second side wall with one of said bores of said first named side wall, said cylindrical member having a longitudinally and a transversely disposed bore whereby fluid from said first and second chambers are discharged through said cylindrical member.

References Cited in the file of this patent

UNITED STATES PATENTS

| 1,058,464 | Pritchard | Apr. 8, 1913 |
| 1,233,119 | Parker | July 10, 1917 |
| 1,747,377 | Maxson | Feb. 18, 1930 |
| 2,280,388 | Drill | Apr. 21, 1942 |
| 2,717,806 | Dale | Sept. 13, 1955 |
| 2,719,994 | Dorsey | Oct. 11, 1955 |